United States Patent [19]
Moore et al.

[11] Patent Number: 5,626,896
[45] Date of Patent: May 6, 1997

[54] METHOD FOR MAKING LIQUID-CENTERED JELLY CANDIES

[75] Inventors: Carl O. Moore, Rochester; James R. Dial, Moweaqua, both of Ill.

[73] Assignee: A.E. Staley Manufacturing Co., Decatur, Ill.

[21] Appl. No.: 353,449

[22] Filed: Dec. 9, 1994

[51] Int. Cl.$^6$ ........................................ A23G 3/00
[52] U.S. Cl. .................. 426/103; 426/573; 426/576; 426/577; 426/578; 426/660
[58] Field of Search .................... 426/660, 573, 426/576, 577, 578, 103

[56] References Cited

U.S. PATENT DOCUMENTS

| | | | |
|---|---|---|---|
| 3,589,909 | 6/1971 | Godzichi et al. | 426/578 |
| 4,117,176 | 9/1978 | Taylor et al. | 426/578 |
| 4,225,627 | 9/1980 | Moore | 426/578 |
| 4,567,055 | 1/1986 | Moore et al. | 426/578 |
| 4,704,293 | 11/1987 | Moore et al. | 426/573 |
| 4,874,628 | 10/1989 | Eden et al. | 426/578 |
| 4,886,678 | 12/1989 | Chiu et al. | 426/578 |
| 4,913,924 | 4/1990 | Moore et al. | 426/578 |
| 4,988,531 | 1/1991 | Moore et al. | 426/578 |

OTHER PUBLICATIONS

Author: Carl O. Moore, Title: Formula, distributed on Mar. 15, 1994, Apr. 25, 1994 and May 16, 1994.
Author: Carl O. Moore, Title: Technical Data, distributed on Mar. 15, 1994, Apr. 25, 1994 and May 16, 1994.

*Primary Examiner*—Jeanette Hunter
*Attorney, Agent, or Firm*—Arnold, White & Durkee

[57] ABSTRACT

Liquid-centered jelly candy and method for manufacture are claimed. In this invention jelly candy is processed to about 25–30% moisture content and deposited in a starch mold to a level that half fills the mold. A small hard candy pellet is made from sugar, color, flavor, and acidulant. The hard candy pellet is centered on the jelly candy in each of the half full molds. A second deposit of warm jelly candy is filled over the pellets completing the candy pieces. The candy is cured at about 130° F. to about 140° F. for about 24–48 hours. During which time, moisture from the jelly candy migrates to and liquifies each candy pellet forming the liquid-centered jelly candy.

The completed candy pieces are cured in the molds at about 130° F. to about 140° F. for about 24–48 hours. During the curing process, the moisture from the jelly migrates into and liquifies the sugar paste forming a liquid-centered jelly candy.

8 Claims, No Drawings

# METHOD FOR MAKING LIQUID-CENTERED JELLY CANDIES

FIELD OF THE INVENTION

The present invention relates generally to the manufacture of liquid center jelly candies.

BACKGROUND OF THE INVENTION

Jelly candies such as imitation fruit pieces, fruit bars, jellybean centers, and sugared jellies have been prepared with sugar (e.g., sucrose, 42 and/or 64 D.E. corn syrups), water, and starch for many years. These confections have a firm, but soft, texture that contributes to their desirable mouth feel. Jelly candies are typically manufactured by a starch mold casting process known in the trade as the Mogul system. Starch molds are formed by making a plurality of depressions of the desired shape in a bed of starch. In the Mogul system, the ingredients are cooked at a temperature above the boiling point of the mixture and/or at a moisture level above that of the finished confection for a sufficient length of time to fully activate or gelatinize the starch. In a typical pressure cooking process for a commercial Mogul system, the ingredients are cooked at a moisture of about 20–25 weight percent at temperature of about 140°–180° C., for less than about one minute. The starch is generally acid-thinned (also known as thin-boiling) common corn starch or a high amylose starch or a blend of the two. After cooking, the hot liquid mixture is deposited into a starch mold. The starch mold forms the confection and helps to reduce the moisture content. The deposited confections are then routinely dried for about 24–72 hours to reach the desired moisture content of about 14–20 weight percent.

Presently, various procedures are used to manufacture liquid-center candies; such as fondant/invertase liquefaction, center fill co-extrusion, injection filling and center-in-shell co-depositing. However, none of these procedures are acceptable for use with jelly casady.

Fondant/invertase liquefaction is generally accomplished by mixing the enzyme, invertase, in a fondant that is enrobed with chocolate. The enzyme later converts the fondant to a liquid by breaking down sucrose to invert sugar. The enzymatic action is dependant on the amount of available moisture, pH, and temperature. This method does not work well with jelly candy because of the jelly candy's low moisture content. Jelly candy is put into the molds at about 25–30% moisture and then cured at 140° F. for further drying. Thus, by the time the invertase has time to liquify the center filling, there is not enough water remaining for invertase action.

Center fill co-extrusion is generally used to fill hard candy with jam-like material. The first step is to form a rope of hard candy. Second, a small pipe that sticks into the hard candy and is used to pump jam into the candy. The rope of candy is then run through cutters, and pinched to form seams. This method is specific for hard candy, taffy or other high-cooked candy. However, center fill co-extrusion does not work with jelly candy, because there are problems with seal failure.

Center shell depositing uses a depositing nozzle that has a concentric design so that it can pump an outer stream and a center stream at the same time. Pumping is timed so that the outer shell is pumped into the mold first, and then the inside stream comes on after a sleeve of outer candy is created with the initial deposit. It is successfully used to fill peanut butter, fondant and other paste like fillings into chocolate. However, filling thin liquid into jelly candy has not been well demonstrated by this method due to excessive leaks. Leaks are more likely to develop with jelly candy than with other types of candy for several reasons. First, because of the density of sugary liquids, they will sink through hot jelly to the bottom of the mold. As a result, leaks will develop, because the bottom of the piece of candy will have a thin wall. Third, if pump timing is even slightly irregular, filling will be slightly to the side. This will create a thin outer wall, and creates potential for a leak. If the cut off on the nozzle isn't perfectly timed and a string of the inner liquid comes up through the outer jelly, a leak pathway will develop. Fourth, jelly candies tend to shrink and contract as they are dried. This gives them a pressurized effect. If there is any leaker pathway within jelly candy, the liquid is squeezed out of the center.

Since flavors are better perceived in liquid than in colloidal jelly, a free flowing liquid center offers uniquely pleasant eating qualities and delivers a pronounced flavor advantage over solid jelly candy. Texture and eating qualities are improved by the liquid lubrication of the jelly mass during mastication. Additionally, liquid center jelly preparations may have pharmaceutical applications in situations in which the desired dose form is liquid.

Since liquid centers are desirable and present methods for preparing liquid-centered jelly candy are inadequate, a demand exists for a process to prepare jelly candy with liquid centers. Especially one that provides a method for incorporating active components that might interfere with the gelling function if incorporated directly, such as acids, metals, salts, etc.

SUMMARY OF THE INVENTION

The present invention concerns a method of making liquid-filled jelly candy wherein a water-containing jelly candy encapsulates a solid hygroscopic sugar made of crystalline fructose or a blend of fructose with sucrose, dextrose or corn syrup. The hygroscopic sugar absorbs sufficient water from the jelly candy to form an aqueous dispersion of solubilized sugar within the jelly candy. In general, the hygroscopic sugar composition comprises from about 90–100% by weight of the solid sugar piece. The hygroscopic sugar composition may be made by melting fructose, essentially in the absence of water, and depositing the molten fructose into molds or feeding partially cooled molten fructose in its plastic state through a drop frame.

In one embodiment, the invention more particularly comprises a method in which a hard candy pellet is formed and then encapsulated in a jelly candy by pouring hot jelly candy into a mold to fill it half full, placing the hard candy pellet in the center of the hot jelly candy, and covering the hard candy pellet with jelly candy while the molded jelly candy is sufficiently warm to seal itself around the hard candy pellet. This enables the hard candy pellet to absorb sufficient water from the candy jelly to convert the hard candy pellet to a solubilized liquid form.

Generally, the invention comprises a confection made by encapsulating a solid-form sugar that is capable of absorbing sufficient water from jelly candy to convert from solid form to liquid form within the jelly candy. Thus, enabling the solid-form sugar to convert from solid form to liquid form prior to ingestion. One preferred solid-form is a sugar pellet, and a preferred sugar pellet is made of crystalline fructose.

DETAILED DISCLOSURE OF THE INVENTION

Preparing liquid-centered jelly candy may be accomplished by moisture migration from jelly candy to a solid form sugar. The solid form sugar may be a pellet.

Moisture Migration from a Jelly Candy to a Hygroscopic Pellet

The preferred pellet is made from crystalline fructose by melting the fructose, adding color, flavor and acidulant to make a syrup. The syrup is then deposited in starch molds. (Starch molds are formed by making a plurality of depressions of the desired shape in a bed of starch). The pellet hardens within minutes and is removed for later use. An alternative procedure is to allow the hot syrup to partially cool to the plastic state, and then shape it on conventional hard candy equipment such as a drop frame.

A jelly candy is then processed to about 25–30% moisture content and deposited in a starch mold to half fill the mold. The hard candy pellet is centered on the jelly candy in the mold. A second deposit of candy is then filled over the pellet, encapsulating it and completing the configuration of the candy piece.

The filled molds are heated in a curing room for 24–48 hours at about 130°–140° F., during which time the moisture from the jelly migrates into and liquifies the hygroscopic hard candy pellet. Standard jelly candy processing follows. New products could develop that use this technology in other candy products, inclusions for other foods such as baked goods, and in pharmaceutical preparations.

A. The Jelly Candy

Jelly candy is made by adding dissolved gelatin to a mixture made by mixing and heating saccharides, starch, and water.

Sugar is used in a confection primarily for sweetness, but also plays an important role in such physical properties of the confection as crystallinity, gel strength, humectancy, and water activity. Sucrose is available commercially in a dry crystalline form and is generally derived from sugar cane or sugar beets. However, the word sugar is not used as a synonym for sucrose. Other sugars such as dextrose and fructose may also be used.

Dextrose is available commercially in the anhydrous or monohydrate crystalline form, or as a syrup, including syrups containing a mixture of dextrose and another material, e.g. high fructose corn syrup and 64 D. E. corn syrup. Dextrose is generally obtained by the hydrolysis of starch, e.g. from corn. The production and properties of dextrose and corn syrups are discussed by H. M. Pancoast et al., Handbook of Sugars, pp. 157–287 (AVI Publ. Co., Westport, Conn., 2d ed., 1980), the disclosure of which is incorporated by reference. Substantially pure dextrose, as crystalline monohydrate or high solids syrup (e.g. about 70% by weight) are preferred for use here.

Corn syrups are characterized by dextrose equivalent (D. E.) with the high conversion syrups having a high D. E. and a high concentration of dextrose. Lower conversion syrups may be useful, but are not preferred. Corn syrups are typically an inexpensive source of dextrose and thus may be a preferred source of dextrose for this reason. SWEETOSE 4300 corn syrup is a 63 D. E. (dextrose equivalent) corn syrup that is a commercial product of the A. E. Staley Manufacturing Company; Decatur, Ill.

Starch, gelatin, pectin, gellin gum or combinations thereof work well as a stabilizer in jelly candy. However, a starch such as MIRAQUIK® MGL is preferred. MIRAQUIK® MGL is a modified potato starch that functions in jelly candy as a gelling agent. It has improved quick setting gel properties as compared to common modified corn starch and is a commercial product of the A. E. Staley Manufacturing Company; Decatur, Ill.

Coarse gelatin with a gel strength of 250 bloom is a commercial gel with a moderate gel strength. The bloom gel strength indicates the setting property of the gelatin. Gelatin has completely different setting properties than starch. Gelatin is very temperature dependent and sets to a rubbery and tenacious jelly. It gives some gel strength and tends to plasticize the jelly matrix and allows the jelly to flex without cracking, which would lead to leaking. A straight starch jelly gum drop is a shorter textured, more brittle gel as it ages and if you twist straight starch jelly candy with a liquid pocket in the center it is much more easy to break or crack the side wall, whereas if you have gelatin in combination with the starch, it plasticizes and allows more flexibility in the jelly so that its not as prone to break or crack. One of the many 250 bloom course gelatins is commercially available from Sanoff Bio-Industries, Waukesha, Wis.

Water present in jelly candy can be from any potable drinking water source. Water in jelly candy functions to dissolve gelatin and as a processing aide in cooking starch. As starch is heated, it absorbs water causing starch to swell and burst, which frees starch molecules into the hot liquid. As the liquid cools, the molecules re-orient to form a gel lattice that produces gel qualities. The textural quality of jelly candy is directly affected by the percentage of water. If there is ample water content, the texture of the gel will be soft and desirable. Whereas, if there is not sufficient water, the gel will become tough and chewy. Ten to thirty percent water is recommended for proper consistency of the jelly candy of this invention.

Color is added to the jelly candy for aesthetic appeal. Flavors may be any flavor normally associated with candy. Acidulants are also added for flavor. Any food grade acid may be used, for example citric or malic. Colors, are generally commercially available from most food vendors such as Warner Jenkinson, in St. Louis, Mo.

B. The Pellet Center

One method to prepare a liquid-centered jelly candy is by use of a small hard candy pellet component. The candy pellet is made by melting dry crystalline fructose. It may also be in the form of compressed tablets or hard pastes. Partial blends of fructose with sucrose, dextrose or corn syrups may also be suitable. Melting is accomplished by placing the fructose in a steam jacketed kettle and stirring while heating to a temperature of from about 240° F. to about 270° F. or until the fructose is melteel or almost melted. After melting the dry crystalline fructose; color, flavor, and acidulant are added. Once mixed, the pellet mixture is placed in starch molds and allowed to harden. Ideally, the small hard candy pellets should be shaped as a ball that measures about ⅛" diameter.

The crystallization of fructose is disclosed in U.S. Pat. Nos. 3,883,365 (Forsberg, et al.), 3,928,062 (Yamauchi), 4,199,374 (Dioredi, et al.), and 4,643,773 (Day). Crystalline fructose is distinguished from materials containing significant amounts of amorphous fructose or corn syrup by products, e.g., the semi-crystalline fructose disclosed in U.S. Pat. No. 4,517,021 (Schollmeier). As with the jelly candy, color is added to the pellet for aesthetic appeal. Flavors may be any flavor normally associated with candy. Acidulants are also added for flavor. Any food grade acid may be used, for example citric, malic or lactic. Colors, acidulants, and flavors are generally commercially available from most food vendors. Colors are available from Warner Jenkinson, in St. Louis, Mo.

Once the jelly candy and pellet centers are made, the confection must be formed. The hot jelly candy is placed in starch molds to fill the mold one half full. The hard candy pellet component is centered in the mold, on the top and in the center of the jelly candy. More hot jelly candy is added to cover the hard candy pellet and fill the mold. Then the molded candy is cured at about 140° F. for 48 hours. After cooling, the candies are taken out of the molds and polished with oil.

Additional advantages and modifications will be readily apparent to those skilled in the art. The invention in its broader aspects is therefore not limited to the specific details or representative examples described. Accordingly, departures may be made from the detail without departing from the spirit or scope of the disclosed general inventive concept.

METHODS FOR MAKING LIQUID-CENTERED JELLY CANDIES VIA MOISTURE MIGRATION LIQUEFACTION

EXAMPLE 1

This Example illustrates the preparation of Liquid-Centered Fruit Slices. The following ingredients were used in preparing the small hard hygroscopic sugar pellets called hard candy pellets.

| Ingredients | Percent |
| --- | --- |
| Crystalline Fructose[1] | 100% of initial melted product, prior to adding color, flavor and acid. |
| Dry Yellow #5 | as needed for desired color |
| Lemon oil | as needed for desired flavor |
| dry powered citric acid | 2% of total weight of pellet |

[1]Commercially available as KRYSTAR ® 300 Crystalline Fructose from A. E. Staley Manufacturing Company of Decatur, Illinois.

The following ingredients were used in preparing the jelly candy:

| Ingredients | Grams |
| --- | --- |
| Staley 1300 Corn Syrup | 1070 |
| Crystalline dextrose | 360 |
| Granulated sugar | 1000 |
| MIRAQUIK ® MGL Potato Starch | 115 |
| Confectioners G Corn Starch | 200 |
| Water | 2150 |

The hard candy pellets are prepared by melting dry crystalline fructose in a steam jacketed kettle with 40# steam to a peak temperature of 240° F. with gradual stirring. Then adding color (Dry yellow #5), lemon oil, and 2% dry powdered citric acid. Stir to disperse and deposit the liquid into starch molds, allow to harden and removing for later use. Each hard candy pellet should be a cylinder that measures ½" long and ⅛" diameter.

The jelly candy is prepared by mixing Staley 1300 Corn syrup, crystalline dextrose, granulated sugar, MIRAQUIK® MGL Potato Starch, Confectioners G Corn Starch and water in a open steam jacketed kettle at 50 to 70% soluble solids. After completing the evaporative cooking to 70% soluble solids, add color, flavor, and acidulant. Deposit the jelly into a starch fruit slice mold, halfway filling the mold. Drop the hard candy pellet, onto the surface of the jelly candy and then cover with a second jelly candy deposit. Place molding tray in 140° F. cure for 48 hours. After cooling, de-mold and polish with oil.

EXAMPLE 2

This Example illustrates the preparation of traditional jujube jelly candy with new high flavor impact liquid centers. The following ingredients were used in preparing the hard candy pellets.

| Ingredients | Amount |
| --- | --- |
| Crystalline Fructose[2] | 1000 grams |
| Crystalline Citric Acid | 20 grams |
| Raspberry Flavor[3] | 3 ml. |

[2]Commercially available as KRYSTAR ® 300 Crystalline Fructose from A. E. Staley Manufacturing Company of Decatur, Illinois.
[3]Commercially available from Curt Georgi Company as #553760-Rasp Nat ID Flav Subst.

Place the fructose in a small steam jacketed kettle without adding any water. Melt the fructose into a free flowing liquid. Then add acid and flavor and deposit the mixture into starch molds that are approximately ⅛" button shape. Allow the mixture to cool and remove as hard candy pellets. The mixture could be slabbed and formed as hard candy.

The following ingredients were used in preparing the jelly candy.

| Ingredients | Amount |
| --- | --- |
| 62 DE corn Syrup | 12200 grams |
| Granulated Sugar | 7600 grams |
| MIRAQUIK ® MGL Starch | 2640 grams |
| Water | 6500 grams |
| Gelatin 250 B 1 Coarse | 550 grams |

The jelly candy mixture is formed by the following steps. Mix and preheat sweeteners, starch, and 4500 grams of water to 210° F. forming a main slurry, and allow to cool to 200° F. by removing the heat source. Mix and heat 550 grams of gelatin and 2000 grams of water to 160° F. and add this mixture to the main slurry which has cooled to 200° F. Jet cook this mixture to 285° F. Add additional Raspberry flavor and color as desired. Deposit this mixture in molds at 70% dry solids. Fill each mold to ½ full with jelly candy mixture, then drop the hard candy pellet on the jelly candy surface and cover the hard candy pellet with a second jelly candy deposit. Cure the candy overnight in starch molds at 140° F. Allow to cool, demold, and coat with a suitable oil glazing material.

What is claimed is:

1. A method of making a liquid-filled confection comprising:

encapsulating a solid hygroscopic sugar composition within a water-containing jelly candy, said solid sugar composition capable of absorbing sufficient water from the jelly candy to form an aqueous dispersion of the sugar within the jelly candy.

2. The method of claim 1, wherein the hygroscopic sugar composition is encapsulated within the jelly candy while the jelly candy is in a mold.

3. The method of claim 1, wherein the hygroscopic sugar composition further comprises a compressed tablet.

4. The method of claim 1, wherein the hygroscopic sugar composition comprises crystalline fructose, or blends of fructose with sucrose, dextrose or corn syrup.

5. A method of making a liquid-filled confection, wherein the hygroscopic sugar composition is encapsulated within the jelly candy by:

forming a first portion of the jelly candy within a mold;

depositing a pellet of a hygroscopic sugar composition centrally on said first portion; and forming a second portion of the jelly candy on the first portion within said mold so as to encapsulate the pellet within the first and second portions.

6. The method of claim 5, wherein the hygroscopic sugar composition further comprises a compressed tablet.

7. A confection comprising a jelly candy and an aqueous sugar dispersion encapsulated within the jelly candy.

8. The confection of claim 7, wherein the sugar comprises fructose or blends of fructose with sucrose, dextrose or corn syrup.

* * * * *

UNITED STATES PATENT AND TRADEMARK OFFICE
CERTIFICATE OF CORRECTION

PATENT NO. : 5,626,896

DATED : May 6, 1997

INVENTOR(S) : Carl O. Moore and James R. Dial

It is certified that error appears in the above-indentified patent and that said Letters Patent is hereby corrected as shown below:

In the specification at column 1, lines 37 the word "casady" should be -- candy --.

In the specification at column 4, line 43 the word "melteel" should be -- melted --.

Signed and Sealed this

Thirtieth Day of September, 1997

Attest:

BRUCE LEHMAN

Attesting Officer

Commissioner of Patents and Trademarks